United States Patent
Singh

(10) Patent No.: US 12,141,325 B2
(45) Date of Patent: Nov. 12, 2024

(54) COMPUTER-IMPLEMENTED METHOD AND SYSTEM FOR CHECKING DATA ANONYMIZATION

(71) Applicant: Siemens Aktiengesellschaft, Munich (DE)

(72) Inventor: Saurabh Narayan Singh, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/572,088

(22) PCT Filed: May 30, 2022

(86) PCT No.: PCT/EP2022/064573
§ 371 (c)(1),
(2) Date: Dec. 19, 2023

(87) PCT Pub. No.: WO2022/268439
PCT Pub. Date: Dec. 29, 2022

(65) Prior Publication Data
US 2024/0265142 A1 Aug. 8, 2024

(30) Foreign Application Priority Data
Jun. 25, 2021 (EP) .................... 21181850

(51) Int. Cl.
*G06F 21/62* (2013.01)
*G06F 16/2457* (2019.01)

(52) U.S. Cl.
CPC .... *G06F 21/6254* (2013.01); *G06F 16/24573* (2019.01)

(58) Field of Classification Search
CPC .................. G06F 21/6254; G06F 16/24573
See application file for complete search history.

(56) References Cited

U.S. PATENT DOCUMENTS 11,093,641 B1 * 8/2021 Whalen ................. G06F 16/906
11,250,162 B2 * 2/2022 Praveen ................. G06F 18/23
(Continued)

FOREIGN PATENT DOCUMENTS

CN 110719176 A 1/2020

OTHER PUBLICATIONS

Shinsaku, Kiyomoto et al: "On blockchain-based anonymized dataset distribution platform"; 2017 IEEE 15th International Conference on Software Engineering Research; Management and Applications (Sera); IEEE; Jun. 7, 2017; pp. 85-92; XP033111706; DOI: 10.1109/SERA.2017.7965711; 2017.
(Continued)

*Primary Examiner* — Michael R Vaughan
(74) *Attorney, Agent, or Firm* — Schmeiser, Olsen & Watts LLP

(57) ABSTRACT

Provided is a computer-implemented method and system for checking anonymisation of data. Anonymized data are analysed by means of a smart contract process based on data privacy rules automatically raising a flag in case of an anomaly. The smart contract is governed in a decentralized manner where anodes of distributed database can verify the rules specified in the smart contract and/or assess an anomalous situation. To this end, test data are generated at the data source by applying the data privacy rules to the original data. The test data are checked against the anonymized data and depending on the check result metadata are generated. The metadata are provided to nodes of a distributed database for further verification.

13 Claims, 3 Drawing Sheets

(56) References Cited

U.S. PATENT DOCUMENTS

Figure 1:
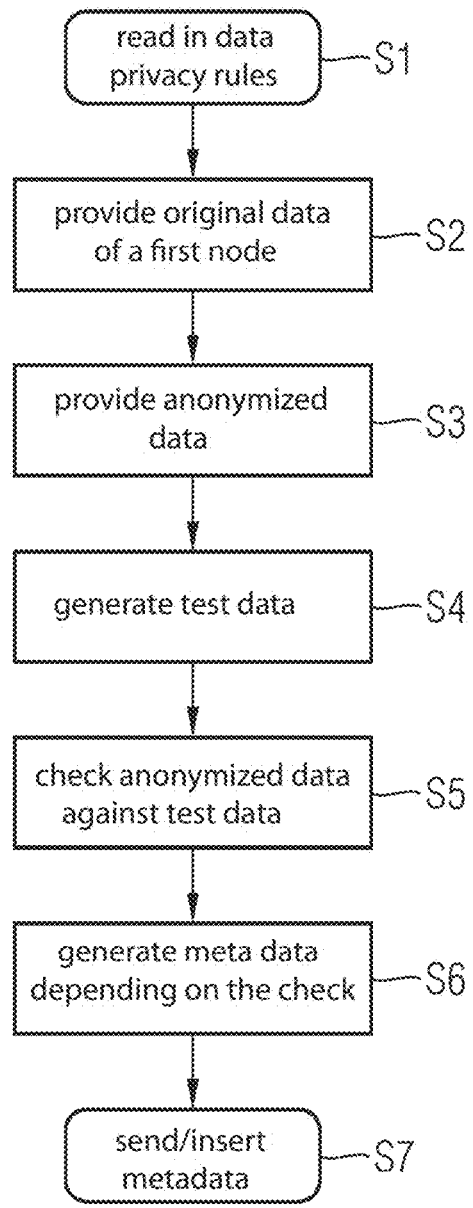

| | | | |
|---|---|---|---|
| 2015/0067881 A1 | 3/2015 | Badstieber et al. | |
| 2019/0058991 A1* | 2/2019 | Al-Kabra | H04L 63/0421 |
| 2020/0159697 A1* | 5/2020 | Wood | G06F 16/162 |
| 2020/0410135 A1 | 12/2020 | Macey et al. | |
| 2021/0226922 A1* | 7/2021 | Cohen | H04L 63/0407 |
| 2021/0336938 A1* | 10/2021 | Karabatis | H04L 63/1475 |
| 2022/0147654 A1* | 5/2022 | Beach | G06F 21/6254 |

OTHER PUBLICATIONS

PCT International Search Report and Written Opinion of International Searching Authority mailed Dec. 29, 2022 corresponding to PCT International Application No. PCT/EP2022/064573 filed May 30, 2022.

* cited by examiner

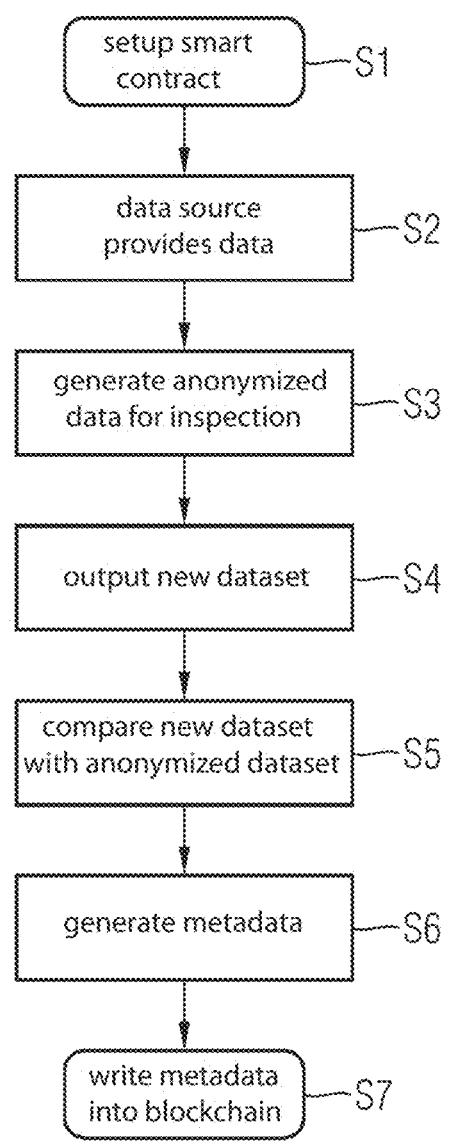

COMPUTER-IMPLEMENTED METHOD AND SYSTEM FOR CHECKING DATA ANONYMIZATION

CROSS-REFERENCE TO RELATED APPLICATIONS

This application claims priority to PCT Application No. PCT/EP2022/064573, having a filing date of May 30, 2022, which claims priority to EP Application No. 21181850.5, having a filing date of Jun. 25, 2021, the entire contents both of which are hereby incorporated by reference.

FIELD OF TECHNOLOGY

The following relates to a computer-implemented method and a system for checking anonymization of data as well as a computer program product.

BACKGROUND

Data collection is one of the most important aspects to support data analytics, process mining, machine learning, and/or artificial intelligence. However, such collection of data also raises concerns regarding data privacy and identification of users based on the data. With more and more importance and regulations being applied to protect user data privacy, data anonymization techniques can be used to ensure protection of user identity. Data anonymization basically removes identifiable parts of the data before or during collecting and before sending data to the data collector. There are various technical ways to achieve data anonymization, but the end-result should be compliant with the data privacy regulations irrespective of the techniques used. However, there is a need for an automatic review mechanism on whether the data was correctly anonymized. Furthermore, usually there is no proof if anonymization was correctly performed, e.g., for later audits.

US 2020/410135 A1 discloses a method for providing access to information, comprising method steps for anonymizing data.

SUMMARY

An aspect relates to provide verification of data anonymization.

Embodiments of the invention provide according to the first aspect a computer-implemented method for checking anonymisation of data, the method comprising the steps:
reading in data privacy rules,
storing original data of a first node of a distributed database,
reading in anonymized data, wherein the anonymized data were generated by means of an anonymization method and depending on the original data when retrieving the original data by a second node of the distributed database,
generating test data by applying the data privacy rules to the original data,
checking at least part of the anonymized data against at least part of the test data and outputting a check result,
generating metadata depending on the check result, and
sending the metadata to the distributed database.

Embodiments of the invention provide according to a second aspect a system for checking anonymisation of data, the system comprising:

a first interface which is configured to read in data privacy rules,
a storage module configured to store original data of a first node of a distributed database,
a second interface which is configured to read in anonymized data, wherein the anonymized data were generated by means of an anonymization method and depending on the original data when retrieving the original data by a second node of the distributed database,
a test data generator which is configured to generate test data by applying the data privacy rules to the original data,
a checking module which is configured to check at least part of the test data against at least part of the anonymized data and outputting a check result,
a metadata generator which is configured to generate metadata depending on the check result, and
an output module which is configured to send the metadata into the distributed database.

Unless indicated otherwise in the description below, the terms "perform", "calculate", "computer-aided", "compute", "discover", "generate", "configure", "reconstruct" and the like relate to actions and/or processes and/or processing steps that alter and/or produce data and/or that convert data into other data, the data being able to be presented or available as physical variables, in particular, for example as electrical impulses. In particular, the expression "computer" should be interpreted as broadly as possible in order to cover in particular all electronic devices having data processing properties.

Computers can therefore be for example personal computers, servers, programmable logic controllers (PLCs), handheld computer systems, Pocket PC devices, mobile radios and other communication devices that can process data in computer-aided fashion, processors and other electronic devices for data processing. A processor can be in particular a central processing unit (CPU), a microprocessor or a microcontroller, for example an application-specific integrated circuit or a digital signal processor, possibly in combination with a memory unit for storing program instructions, etc. A processor can, by way of example, also be an IC (integrated circuit), in particular an FPGA (field programmable gate array) or an ASIC (application-specific integrated circuit), or a DSP (digital signal processor) or a graphics processor GPU (graphics processing unit). A processor can also be understood to mean a virtualized processor, a virtual machine or a soft CPU. It can, by way of example, also be a programmable processor that is equipped with configuration steps for carrying out the method according to embodiments of the invention or that is configured by means of configuration steps such that the programmable processor realizes the features according to embodiments of the invention for the method, the component, the modules or other aspects and/or sub-aspects of embodiments of the invention.

Within the context of embodiments of the invention, a "module" can be understood to mean for example a processor and/or a memory unit for storing program instructions. By way of example, the processor is configured specifically to execute the program instructions such that the processor performs functions to implement or perform the method according to embodiments of the invention or a step of the method according to embodiments of the invention. A module can, by way of example, also be a node of the distributed database system that for example performs/realizes the specific functions/features of an applicable module. The respective modules can, by way of example, also be in the form of separate or standalone modules. To this end, the applicable modules can comprise further elements, for example. These elements are for example one or more interfaces (e.g., database interfaces, communication interfaces—e.g., network interface, WLAN interface) and/or an evaluation unit (e.g., a processor) and/or a memory unit. The interfaces can be used for example to interchange (e.g., receive, convey, send or provide) data. The evaluation unit can be used for example to compare, check, process, assign or calculate data in computer-aided and/or automated fashion. The memory unit can be used for example to store, retrieve or provide data in computer-aided and/or automated fashion.

Within the context of embodiments of the invention, "provide", in particular in regard to data and/or information, can be understood to mean for example computer-aided provision. Provision is effected for example via an interface (e.g. a database interface, a network interface, an interface to a memory unit). This interface can be used for example to convey and/or send and/or retrieve and/or receive applicable data and/or information during the provision.

Within the context of embodiments of the invention, "provision" can also be understood to mean for example loading or storing, for example of a transaction containing applicable data. This can, by way of example, be effected on or by a memory module. "Provision" can also be understood to mean for example transmitting (or sending or conveying) of applicable data from one node to another node of the blockchain or of the distributed database system (or the infrastructure thereof).

Within the context of embodiments of the invention, "smart contract process" can be understood to mean in particular an execution of a program code (e.g., of the control instructions) in a process by the distributed database system or the infrastructure thereof.

Within the context of embodiments of the invention, "insertion into the distributed database system" and the like can be understood to mean for example that, in particular, a transaction or the transactions or a data block with its transactions is conveyed to one or more nodes of a distributed database system. If these transactions are for example validated successfully (e.g., by the node/s), these transactions are in particular concatenated as a new data block with at least one existing data block of the distributed database system. For this purpose, the applicable transactions are stored for example in a new data block. In particular, this validation and/or concatenation can be performed by a trusted node (e.g., a mining node, a blockchain oracle or a blockchain platform).

Within the context of embodiments of the invention, "transaction" or "transactions" can be understood to mean for example a smart contract, a data structure or a transaction data record that, in particular, each comprise one of the transactions or multiple transactions. Within the context of embodiments of the invention, "transaction" or "transactions" can also be understood to mean for example the data of a transaction of a data block of a blockchain. A transaction can in particular comprise a program code that provides a smart contract, for example. By way of example, within the context of embodiments of the invention, a transaction can also be understood to mean a control transaction and/or confirmation transaction. Alternatively, a transaction can, by way of example, be a data structure that stores data (e.g., the control instructions). A transaction can in particular comprise a program code that provides a smart contract, for example.

Within the context of embodiments of the invention, a "program code" (e.g., a smart contract) can be understood to mean for example a program instruction or multiple program instructions, in particular stored in one or more transactions. The program code is in particular executable and is executed by the distributed database system, for example. This can be realized by means of an execution environment (e.g., a virtual machine), for example, the execution environment or the program code being Turing complete. The program code is executed by the infrastructure of the distributed database system. This involves for example a virtual machine being realized by the infrastructure of the distributed database system.

Within the context of embodiments of the invention, a "smart contract" can be understood to mean for example an executable program code (see in particular the "program code" definition). The smart contract is stored in a transaction of a distributed database system (e.g., a blockchain), for example in a data block of the distributed database system. By way of example, the smart contract can be executed in the same way as explained in the definition of "program code", in particular within the context of embodiments of the invention.

Within the context of embodiments of the invention, a "distributed database", which, by way of example, can also be referred to as a distributed database system, can be understood to mean for example a locally distributed database, a blockchain, a distributed ledger, a distributed memory system, a distributed ledger technology (DLT) based system (DLTS), a revision-proof database system, a cloud, a cloud service, a blockchain in a cloud or a peer-to-peer database.

A "distributed database system" can also be understood to mean for example a distributed database system that has at least some of its nodes and/or devices and/or infrastructure implemented by a cloud. By way of example, the applicable components are implemented as nodes/devices in the cloud (e.g., as virtual nodes in a virtual machine).

The distributed database system can be a public distributed database system (e.g., a public blockchain) or a closed (or private) distributed database system (e.g., a private blockchain), for example.

A distributed database system can also be a distributed communication system for data interchange or a peer-2-peer communication system or a peer-2-peer application, for example. This can be a network or a peer-2-peer network, for example. A/the distributed database system can also be a local distributed database system and/or a local distributed communication system, for example.

Within the context of embodiments of the invention, a "blockchain node", "node", "node of a distributed database system" and the like can be understood to mean for example devices (e.g., field devices), computers, smartphones, clients or subscribers that perform operations for (with) the distributed database system (e.g., a blockchain). Such nodes can, by way of example, execute transactions of a distributed database system or the data blocks thereof or insert or concatenate new data blocks with new transactions into the distributed database system by means of new data blocks.

Within the context of embodiments of the invention "data privacy rules", also referred to as privacy rules or (privacy) regulations, can be understood to comprise definitions, constraints and/or regulations concerning the data privacy. Data privacy rules can for example be based on data classification, wherein data classification defines which data is classified as private. For example, data privacy rules can define which part of a dataset is subject to restrictions when collecting or storing the dataset. An application of data privacy rules to a dataset can for example mean to delete or modify at least part of the dataset to fulfill the data privacy rules.

Within the context of embodiments of the invention "anonymization" can be understood as data anonymization using a known anonymization method/technique. An anonymization method can for example comprise suppression, where information is removed from the data, generalization, where information is generalized/coarsened, perturbation, where information is modified, e.g., by adding noise to the data, and permutation, where information is swapped.

It is an advantage of embodiments of the invention to automate the verification of data anonymization, wherein the automation can be governed by a smart contract executed on a distributed database system. Since such smart contract is run by a set of nodes of the distributed database system, the chances of individual oversight can be minimized.

The check can for example be performed by comparing the content of a data structure of the anonymized data with the content of a data structure of the test data. The check result can then be provided as metadata. Therefore, the metadata are linked to the respective original data. Since only the metadata are provided, data privacy is maintained while providing proof about the performed data anonymization. Therefore, also future audits of the data anonymization can be enabled.

According to an embodiment of the method, in case of a negative check result, the metadata can comprise information about the deviation of the anonymized data from the test data.

Therefore, the metadata can be further analysed and/or verified. A deviation of the anonymized data from the test data can be for example a data field and/or a particular information contained in the anonymized data which is not present in the test data. In case of a positive check result, the metadata comprise only an information about the correctly performed anonymization.

According to a further embodiment of the method the anonymisation method can be defined by the second node.

The data collector, i.e., the second node, can predefine/provide the anonymisation method. When collecting/retrieving the data from the first node, the anonymisation technique should ensure that the data privacy rules are fulfilled.

According to a further embodiment of the method the metadata can comprise information about the anonymization method.

The metadata are generated automatically when reading/collecting the original data by the second node. The metadata can comprise information about the performed data anonymization method/technique. The metadata comprise no sensitive information but only information required for verifying the data anonymization process.

According to a further embodiment of the method the data privacy rules can define which part of the original data needs to be removed.

To this end, the data privacy rules define which part of a dataset should not be disclosed. For example, the data privacy rules can define that for example name, age, gender, etc. of a data provider/data owner should not be collected by a data collector.

According to a further embodiment of the method, in case of a negative check result, the applied anonymization method and/or the second node can be flagged.

For example, an auditor can further check the anonymized data based on this flag.

According to a further embodiment of the method the metadata and/or the check result can be stored in the distributed database.

For example, the metadata can be inserted into the distributed database. Therefore, the information about a data anonymization process can be immutable stored and can for example be used, e.g., for future audits.

According to a further embodiment of the method the data privacy rules can be defined by selected nodes of the distributed database.

The data privacy rules can be governed by a selected subset of nodes of the distributed database system.

According to a further embodiment of the method the metadata can be verified against the data privacy rules by at least one selected node of the distributed database and/or an external entity.

According to a further embodiment of the method the metadata can be verified by multiple selected nodes of the distributed database and the verification is based on a consensus method performed by the selected nodes.

This has for example the advantage that the anonymization process is checked by several entities ensuring that the anonymization was correctly performed.

According to a further embodiment of the method, the method steps can be implemented by means of a smart contract which is executed by nodes of the distributed database.

Therefore, verification of the anonymization can be automated. Since the smart contract can be run by a set of nodes, the chances of individual oversight are minimized. Furthermore, a smart contract can be updated based on rules/regulations to maintain ongoing compliance.

According to a further embodiment of the method the distributed database can be a blockchain or a distributed ledger.

In addition, a computer program product (non-transitory computer readable storage medium having instructions, which when executed by a processor, perform actions) having program instructions for performing the aforementioned methods according to embodiments of the invention, wherein one of the methods according to embodiments of the invention, all of the methods according to embodiments of the invention or a combination of the methods according to embodiments of the invention is performable by means of the computer program product each time.

BRIEF DESCRIPTION

Figure 2:
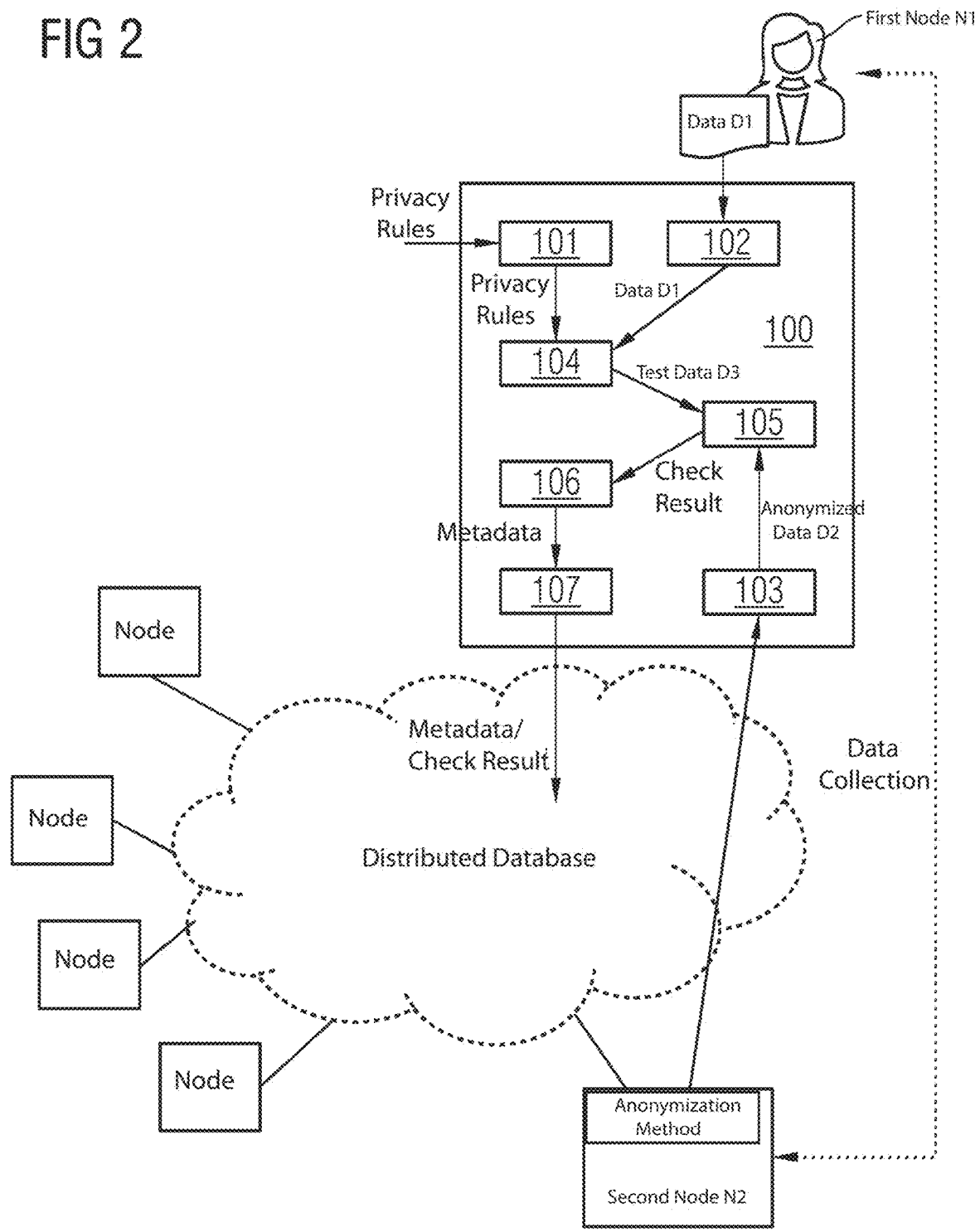

Some of the embodiments will be described in detail, with reference to the following figures, wherein like designations denote like members, wherein:

FIG. 1: shows a first exemplary embodiment of the invention;

FIG. 2: shows a second exemplary embodiment of the invention; and

FIG. 3: shows a third exemplary embodiment of the invention.

DETAILED DESCRIPTION

Equivalent parts in the different figures are labeled with the same reference signs.

Moreover, in particular a (relevant) person skilled in the art is of course aware of all routine options for realizing products or options for implementation in the conventional art, and so there is no need in particular for independent disclosure in the description. In particular, these customary realization variants known to a person skilled in the art can be realized exclusively by hardware (components) or exclusively by software (components). Alternatively, and/or additionally, a person skilled in the art, within the scope of his/her expert ability, can choose to the greatest possible extent arbitrary combinations according to embodiments of the invention of hardware (components) and software (components) in order to implement realization variants according to embodiments of the invention.

A combination according to embodiments of the invention of hardware (components) and software (components) can occur in particular if one portion of the effects according to embodiments of the invention is brought about exclusively by special hardware (e.g., a processor in the form of an ASIC or FPGA) and/or another portion by the (processor- and/or memory-aided) software.

In particular, in view of the high number of different realization options, it is impossible and also not helpful or necessary for the understanding of embodiments of the invention to name all these realization options. In this respect, in particular all the exemplary embodiments below are intended to demonstrate merely by way of example a few ways in which in particular such realizations of the teaching according to embodiments of the invention could be manifested.

Consequently, in particular the features of the individual exemplary embodiments are not restricted to the respective exemplary embodiment, but rather relate in particular to embodiments of the invention in general. Accordingly, features of one exemplary embodiment can also serve as features for another exemplary embodiment, in particular without this having to be explicitly stated in the respective exemplary embodiment.

FIG. 1 shows a first exemplary embodiment of the invention. It shows a flowchart illustrating the method steps of a computer-implemented method for checking anonymisation of data.

Data can for example be personal, sensitive and/or security data owned by a data source/data owner. For example, data are provided by a data source, e.g., an individual or a device. The data can for example be collected/retrieved from the data source by a data collector. For example, data can be provided in/by an individual or group of IoT devices and sensors owned by an entity and can be collected by another entity which can provide analytics and intelligence based on that data. Data can for example be provided by a group of individuals based on activities, for example parking patterns or traffic information, and can be collected by autonomous driving companies for intelligence.

The method can be implemented by means of a smart contract process run on nodes of a distributed database system. For example, the data source and the data collector can both be nodes of said distributed database system. The method enables automated verification of data anonymization, e.g., by means of a smart contract process. In addition, information about the performed data anonymization can be inserted into the distributed database.

The method involves in the first step S1 reading in data privacy rules. The data privacy rules can for example be defined by at least some of the nodes of the distributed database.

In the next step S2, original data of a first node of a distributed database are provided. Original data can for example comprise sensitive, confidential, or personal data parts. It can be for example defined by the data privacy rules which data parts need to be removed or modified when collecting the original data.

The original data can for example be retrieved/collected by a second node of the distributed database system. The second node defines an anonymization method which is applied to the original data when retrieving it, thus generating anonymized data. In other words, when collecting/retrieving the original data, the original data are modified by means of the anonymization method, such that the data collector retrieves merely anonymized data.

In the next step S3, the anonymized data are provided. The anonymized data is read when it is created and before it is collected by the data collector.

In the next step S4 test data are generated by applying the data privacy rules to the original data. To this end, the original data are modified to comply with the data privacy rules. Hence, test data comprise only approved/authorized data parts which follow the data privacy rules.

In the next step S5 at least part of the anonymized data is checked against at least part of the test data and a check result is output. It is for example possible to compare the anonymized data with the test data and return a comparison result. It is also possible to randomly select part of the test data and to compare a corresponding part of the anonymized data.

The check result can be negative in case the anonymized data do not correspond to the test data. In this case, the check result can comprise information about the deviation of the anonymized data from the test data.

The check result can be positive in case the anonymized data match the test data. In this case, the check result can comprise a record about the state of the anonymized data.

In the next step S6 metadata are generated depending on the check result. The metadata comprise the check result.

In the next step S7 the metadata can be send and/or inserted into the distributed database. The metadata can for example be part of a transaction, which can be validated by at least part of the nodes of the distributed database. Therefore, the metadata can be immutable stored in the distributed database.

The metadata can then for example be inspected by an auditor, e.g., one node of the distributed database and/or an external auditor. In addition, or alternatively, the metadata can be verified against the data privacy rules, if the check result is negative. The verification can for example be performed by nodes of the distributed database and/or an external auditor. The verification can be performed by a subset of nodes of the distributed database and can be based on a consensus method.

FIG. 2 shows a schematic drawing of an embodiment of a system for checking anonymization of data.

The system 100 comprises a first interface 101, a storage module 102, a second interface 103, a test data generator 104, a checking module 105, a metadata generator 106, and an output module 107.

The system can be at least partly realized by nodes N, N1, N2 of a distributed database DB. The check of the data anonymization process can for example be implemented by executing a smart contract through the nodes of the distributed database. The distributed database DB can be for example a blockchain or distributed ledger.

The system 100 enables data collection DC of data D1 from a first node N1 by a second node N2, wherein data are anonymized using a given anonymization method and the result of the anonymization process is checked automatically.

The first node N1 can for example be a device owned by a user. Data stored on the device can for example comprise sensitive, confidential, or personal data.

The first interface 101 is configured to read in data privacy rules PR. The data privacy rules PR are for example defined by at least part of the nodes N, N1, N2 of the distributed database DB. The data privacy rules PR can be defined in the smart contract.

The storage module 102 is configured to store original data D1 of the first node N1. It is also possible that the storage module 102 only refers to the original data, e.g., through a link.

The second interface 103 is configured to read in anonymized data D2, wherein the anonymized data D2 were generated by means of an anonymization method AM and depending on the original data D1 when retrieving DC the original data D1 by the second node N2.

The test data generator 104 is configured to generate test data D3 by applying the data privacy rules PR to the original data D1.

The checking module 105 is configured to check at least part of the test data D3 against at least part of the anonymized data D2 and output a check result CR.

The metadata generator 106 is configured to generate metadata MD, wherein the metadata comprise the check result CR. In case of a negative check result CR, i.e., if the anonymized data do not match the test data, then the applied anonymization method AM and/or the second node N2 can be flagged. The flag can for example be stored in the distributed database DB.

The output module 107 is configured to insert the metadata MD and/or the check result CR into the distributed database. The metadata MD can then for example be verified against the data privacy rules PR by at least one selected node N of the distributed database DB and/or by an external entity. Alternatively, the metadata MD can be verified by multiple selected nodes of the distributed database and the verification is based on a consensus method performed by the selected nodes.

FIG. 3 shows another embodiment of the method for checking anonymization of data. It shows a flowchart illustrating the method steps of a computer-implemented method for checking anonymisation of data.

When data are collected by a data collector, the data is anonymized using an anonymization technique. A smart contract can be used to analyse the anonymized data based on predefined data privacy rules/regulations and to automatically raise a flag in case of an anomaly or discrepancy. The smart contract is executed by nodes of a distributed database, e.g., a blockchain, and can hence be governed in a decentralized manner. The nodes can verify the rules specified in the smart contract and assess an anomalous situation of the data anonymization. The nodes can approve transactions comprising information about the data anonymization. Hence, this provides a permanent auditable record about the data anonymization which can be utilized in case of future disputes or discrepancies.

The system performing the following method steps can comprise the following components: Nodes forming the distributed network, a smart contract, data classification for different data types being collected, a data source, e.g., an individual or a device from which the data is origination, a governance consortium, which is a subset of nodes of the distributed database which can verify and maintain the proof of anonymization.

Data classification marks for example which data is considered private and needs to be anonymized and which data can be collected by a data collector. For example, data classification can define that a name or a social security number are private, and should therefore not be collected, whereas for example other data can be collected. Essentially, data classification can provide a basis for the data privacy rules which determine the proof of anonymization.

The consortium can consist for example of nodes from enterprises which collect the data, an auditing entity, and/or nodes from individuals or group of individuals whose data is being collected.

Based on the data privacy regulations, the data to be collected can be defined and classified. This classification divides data into two categories: first, the actual data that is being collected post anonymization and, second, metadata associated with the data. This metadata is automatically generated at the source when the data is being anonymized.

The data collection and proof of anonymization is performed as follows.

A smart contract is set up for the data privacy rules, see step S1. Rules in the smart contract are configured to analyze the metadata coming from each data read to verify if the anonymization results are in compliance with the data privacy rules.

Data can be provided by a data source, see step S2. The reader or collector of the data is free to choose any data anonymization mechanism or technique. When reading/collecting the data, anonymized data are generated by means of the anonymization mechanism. The anonymized data can then be provided for inspection of the data anonymization process, see step S3.

The smart contract can provide a definition for metadata based on the data privacy rules, and a script which creates the metadata when the data is being read. This script/The smart contract can compare for example the original data from the data source and the anonymized data that was generated to copy this data. Based on the comparison, the metadata can be generated.

The metadata can be for example generated as follows: Few random data sets from the data source are chosen. The respective anonymized data sets are taken based on the anonymization technique. Based on the data classification and/or the data privacy rules which indicate the fields that need to be removed for user privacy, the chosen original random data set is changed by the script and a corresponding new dataset is outputted, see step S4. Then this new data set based on the data privacy rules is compared with the anonymized data set, see step S5. The metadata then can comprise information about the comparison result.

This comparison can lead to two different cases for generating the metadata, see step S6: If the anonymized data set has correctly omitted the prescribed data, i.e., a positive check result, then the metadata can only record that the status of anonymization is fine. If there is a violation of data anonymization, i.e., a negative check result, the metadata can comprise information about various data fields stored by the anonymized data set and how it differs from the prescribed data privacy rules.

The metadata can then be written to the blockchain network, see step S7. The smart contract can for example verify this metadata against the data privacy rules to confirm whether the anonymization is compliant with the data privacy rules. In case of a positive check result, the consortium nodes can verify and sign that the data anonymization was compliant with the data privacy rules. In case of a negative check result, the smart contract raises a flag regarding the data anonymization technique. Based on this flag, an auditor from the consortium nodes or an external auditor can inspect the anonymized data. After an inspection, e.g., a manual inspection, the auditor can update the state regarding the reading entity and the data anonymization technique on the blockchain. The owner of the data, or the source of origin, can always access the blockchain to access an audit trail of all the data reads and related anonymization reports.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A computer-implemented method for checking anonymisation of data, the method comprising:
    reading in data privacy rules;
    storing original data of a first node of a distributed database;
    reading in anonymized data, wherein the anonymized data were generated by means of an anonymization method and depending on the original data, when retrieving the original data by a second node of the distributed database;
    generating test data by applying the data privacy rules to the original data;
    checking at least part of the anonymized data against at least part of the test data and outputting a check result;
    generating metadata depending on the check result; and
    sending the metadata to the distributed database, wherein the method steps are implemented by means of a smart contract which is executed by nodes of the distributed database.

2. The computer-implemented method according to claim 1 wherein, in case of a negative check result, the metadata comprise information about the deviation of the anonymized data from the test data.

3. The computer-implemented method according to claim 1 wherein the anonymisation method is defined by the second node.

4. The computer-implemented method according to claim 1 wherein the metadata comprise information about the anonymization method.

5. The computer-implemented method according to claim 1 wherein the data privacy rules define which part of the original data needs to be removed.

6. The computer-implemented method according to claim 1 wherein, in case of a negative check result, the applied anonymization method and/or the second node is flagged.

7. The computer-implemented method according to claim 1 wherein the metadata and/or the check result is stored in the distributed database.

8. The computer-implemented method according to claim 1 wherein the data privacy rules are defined by selected nodes of the distributed database.

9. The computer-implemented method according to claim 1 wherein the metadata are verified against the data privacy rules by at least one selected node of the distributed database and/or an external entity.

10. The computer-implemented method according to claim 1 wherein the metadata are verified by multiple selected nodes of the distributed database and the verification is based on a consensus method performed by the selected nodes.

11. The computer-implemented method according to claim 1 wherein the distributed database is a blockchain or a distributed ledger.

12. A computer program product, comprising a computer readable hardware storage device having computer readable program code stored therein, said program code executable by a processor of a computer system to implement a method of claim 1 when the computer program product is run on a computer.

13. A system for checking anonymisation of data, the system comprising:
    a first interface which is configured to read in data privacy rules,
    a storage module configured to store original data of a first node of a distributed database,
    a second interface which is configured to read in anonymized data, wherein the anonymized data were generated by means of an anonymization method and depending on the original data, when retrieving the original data by a second node of the distributed database,
    a test data generator which is configured to generate test data by applying the data privacy rules to the original data,
    a checking module which is configured to check at least part of the test data against at least part of the anonymized data and outputting a check result,
    a metadata generator which is configured to generate metadata depending on the check result,
    and
    an output module which is configured to send the metadata to the distributed database.

* * * * *